(12) United States Patent
Tashiro

(10) Patent No.: US 7,889,449 B2
(45) Date of Patent: Feb. 15, 2011

(54) MEMORY DEVICE FOR STORING DATA AND READING DATA

(75) Inventor: Masami Tashiro, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 190 days.

(21) Appl. No.: 12/267,129

(22) Filed: Nov. 7, 2008

(65) Prior Publication Data

US 2009/0141385 A1 Jun. 4, 2009

(30) Foreign Application Priority Data

Nov. 30, 2007 (JP) ............................. 2007-309743

(51) Int. Cl.
*G11B 27/36* (2006.01)
*G11B 5/09* (2006.01)
*G11B 21/02* (2006.01)

(52) U.S. Cl. ............................. 360/31; 360/53; 360/75

(58) Field of Classification Search ................. None
See application file for complete search history.

(56) References Cited

U.S. PATENT DOCUMENTS 5,588,012 A 12/1996 Oizumi 6,442,715 B1 * 8/2002 Wilson ........................ 714/710
2004/0109253 A1 6/2004 Nishiyama et al.

FOREIGN PATENT DOCUMENTS

| JP | 5-224833 | 9/1993 |
|----|----------|--------|
| JP | A 2003-273885 | 9/2003 |
| JP | A 2004-192676 | 7/2004 |

* cited by examiner

*Primary Examiner*—Daniell L Negrón
*Assistant Examiner*—Regina N Holder
(74) *Attorney, Agent, or Firm*—Greer, Burns & Crain, Ltd.

(57) ABSTRACT

According to an aspect of an embodiment, a memory device has a medium including a plurality of tracks, each of which has a plurality of sectors separated by a plurality of servo areas, for storing data in the sectors of the tracks, a head for writing data into and reading data from the medium and a controller for determining whether the head has read out data from a sector on a target track correctly or not in reference to information obtained from servo areas sandwiching the sector and for driving the head so as to retry reading out data from the sector when the controller determines that the head failed to have read out data on the target track.

14 Claims, 7 Drawing Sheets

MEMORY DEVICE FOR STORING DATA AND READING DATA

BACKGROUND

The present technique relates to a memory device for storing data and reading data from itself.

The error correcting code (ECC) technique and cyclic redundancy check (CRC) technique have been used on a hard disk drive (HDD) to guarantee data during reading. The ECC technique is used to correct data. The CRC technique is used to verify authenticity of data. The CRC technique detects the reading of data on a sector different from the one predicted, based on data unique to sector such as a logical block address (LBA).

For example, Japanese Laid-open Patent Publication No. 2004-192676 discloses a magnetic disk device that guarantees a magnetic recording function by detecting a magnitude of crosstalk between tracks, and performing a status determination as to whether a magnetic recording function is normal or not. For another example, Japanese Laid-open Patent Publication No. 5-224833 discloses a data guarantee method for guaranteeeing data by verifying in a reading operation or a writing operation that an external memory device that reads or writes data on a magnetic disk device or the like has read correctly data at a target address.

Track spacing gets narrow as a storage capacity and a recording density of HDD increase. An unpredictable track can be present between tracks because of a difference between core widths of a write head and a read head, the effect of a single platter servo track writing (STW), and other factors. Data may be written on the unpredictable track. Even if such a track is detected and the data is then written back into an originally intended track, duplicate tracks having the same sector information are present. If data is read out from the unpredictable track because of residual vibration or the like, no sector fault can be detected and garbled data may occur.

The malfunction is described below with reference to FIG. 7, wherein D1 through D3 are predictable tracks while D1' through D3' are unpredictable tracks. If data is written into sectors on tracks D1' through D3', the data is then detected and written into the correct tracks (D1 through D3). When the HDD is used later on, new data may be written on the tracks D1 through D3. The new data on tracks D1 through D3 are now different from the data on tracks D1' through D3' (see an upper portion of FIG. 7).

In this state, data on tracks D1 through D3 should be read during a reading operation. But if data is read out from the tracks D1, D2 and D3' because of residual vibration as represented by an arrow in a lower portion of FIG. 7, data garbling thus takes place with any sector error going unnoticed.

SUMMARY

According to an aspect of an embodiment, a memory device has a medium including a plurality of tracks, each of which has a plurality of sectors separated by a plurality of servo areas, for storing data in the sectors of the tracks, a head for writing data into and reading data from the medium and a controller for determining whether the head has read out data from a sector on a target track correctly or not in reference to information obtained from servo areas sandwiching the sector and for driving the head so as to retry reading out data from the sector when the controller determines that the head failed to have read out data on the target track.

DESCRIPTION OF THE PREFERRED EMBODIMENTS

The embodiments of the present technique are described below with reference to the drawings.

Figure 1:
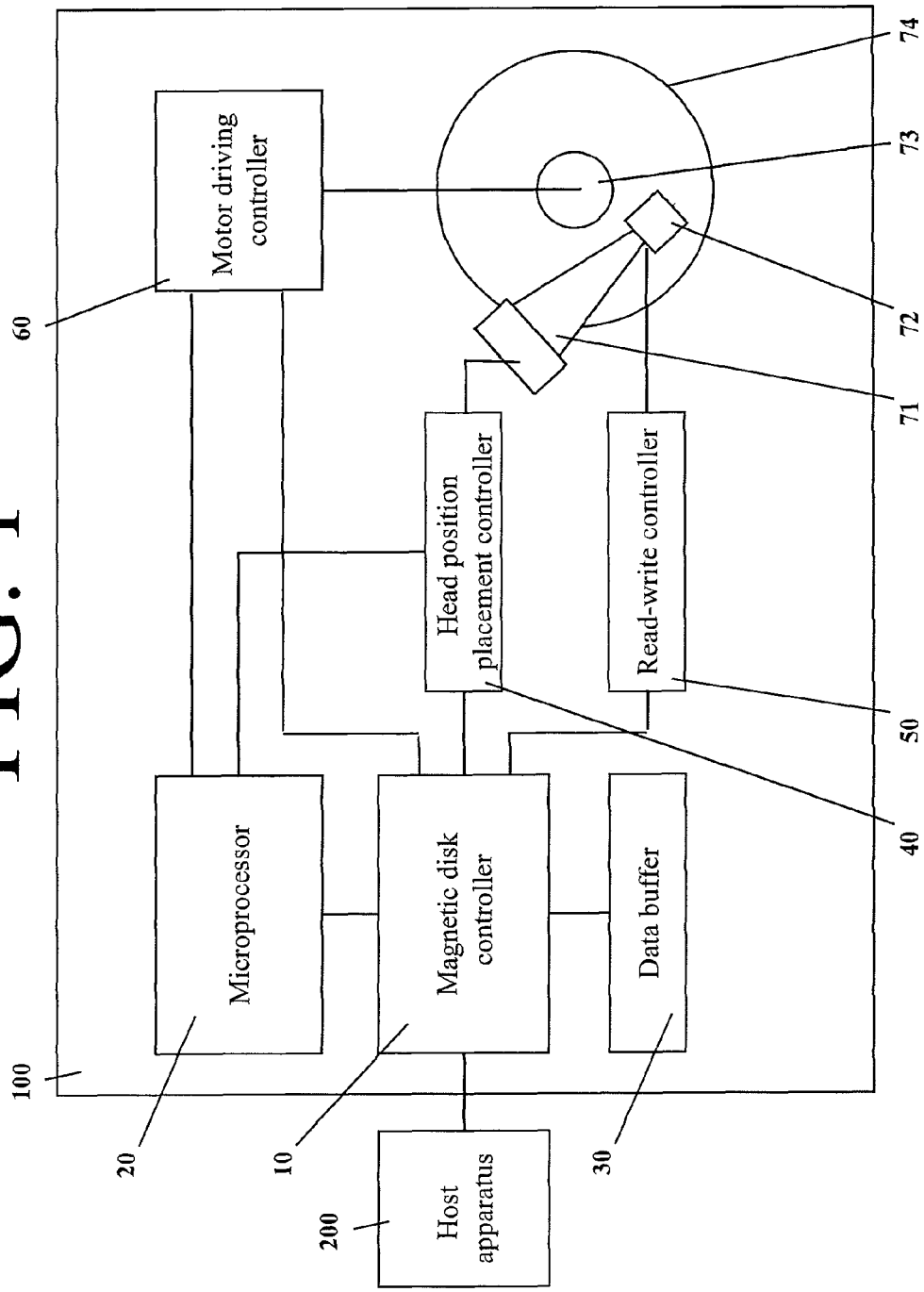
FIG. 1 is a diagram illustrating a magnetic disk device of one embodiment of the present technique.

FIG. 1 illustrates a magnetic disk device 100 of one embodiment of the present technique. The magnetic disk device 100 includes a magnetic disk controller 10, a microprocessor 20, a data buffer 30, a head position placement controller 40, a read-write controller 50, a motor driving controller 60, an actuator 71, a head 72, a spindle motor 73 and a disk medium 74. The head 72 writes data into or reads data from the disk medium 74. The disk medium 74 includes a plurality of sectors separated by a plurality of servo areas.

The magnetic disk controller 10 performs an interface protocol control operation, a data buffer control operation and a disk format control operation. Based on servo information (second servo information) subsequent to predetermined servo information (first servo information) on the disk medium 74, the magnetic disk controller 10 determines whether a sector between the predetermined servo information and the next servo information is an on-track sector or not. And the magnetic disk controller 10 controls whether to output data stored on the sector between the predetermined servo information and the next servo information to a host apparatus or not on the basis of the determination. The magnetic disk controller 10 determines whether the head 72 has read out data from a sector on a target track correctly or not in reference to information obtained from servo areas sandwiching the sector and drives the head 72 so as to retry reading out data from the sector when the magnetic disk controller 10 determines that the head 72 failed to have read out data on the target track.

The microprocessor 20 performs a variety of arithmetic operations while also controlling the read-write controller 50 and the motor driving controller 60. The data buffer 30 is a ring buffer that temporarily stores data before transmitting the data to the host apparatus 200.

The head position placement controller 40 controls operation of the actuator 71 to write and read data. The head position placement controller 40 also determines a position of the head 72. The read-write controller 50 performs a data write control operation and a data read control operation (data modulation and demodulation). The motor driving controller 60 controls the spindle motor 73.

The head 72 is a composite head including a write head for writing data into and a magneto-resistive (MR) head for reading data from the disk medium 74. The spindle motor 73 controls rotation of a spindle shaft supporting the disk medium 74. The disk medium 74 allows data to be written thereon and read therefrom with the head 72 in accordance with a plurality of tracks, a plurality of sectors and a plurality of pieces of servo information as position information data.

Figure 2:
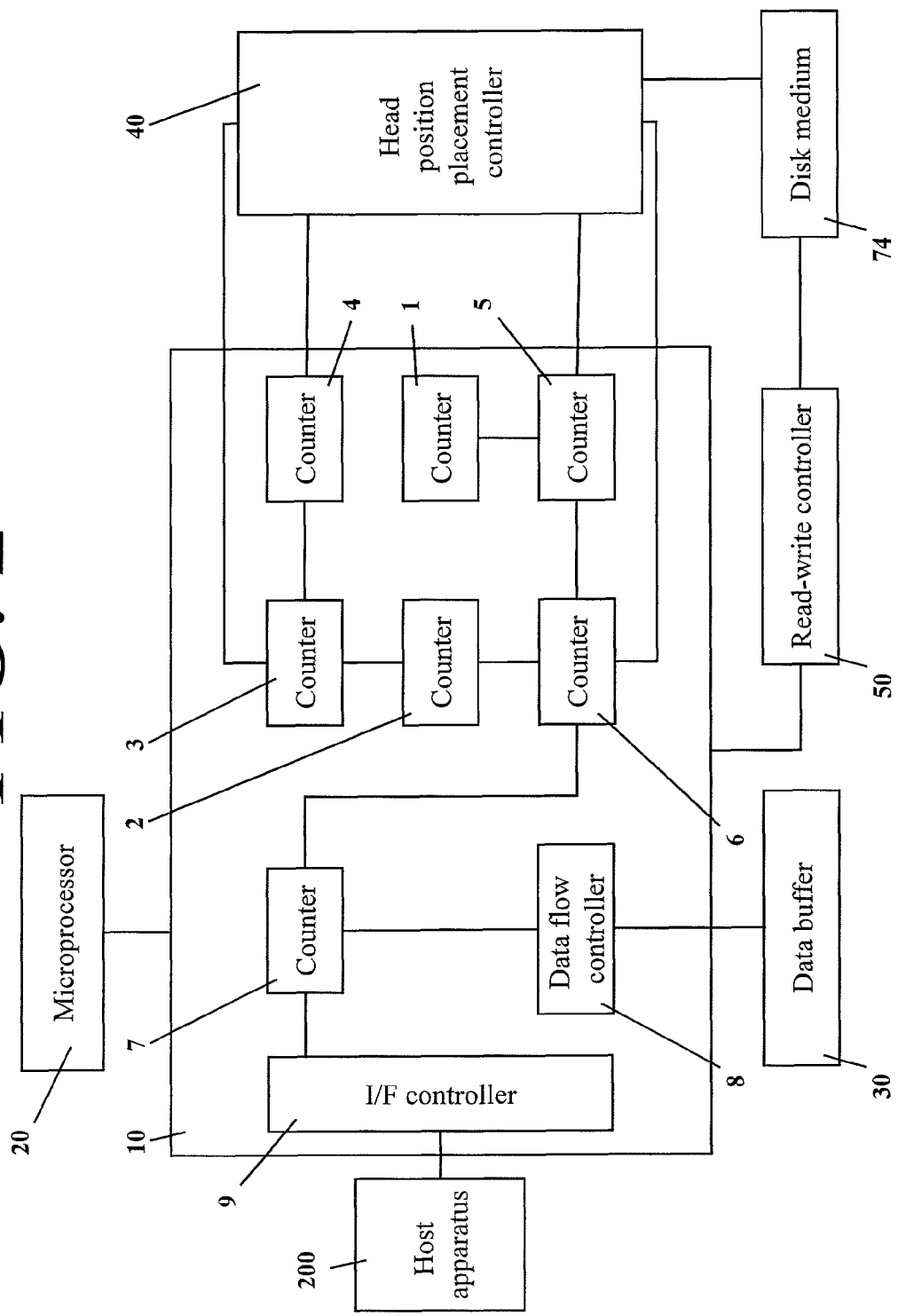
FIG. 2 is a diagram illustrating the magnetic disk controller 10 in details.

FIG. 2 illustrates the magnetic disk controller 10 in details. The magnetic disk controller 10 includes counters 1 through 7, a data flow controller 8 and an interface (I/F) controller 9.

The counters 1 through 7 count the different values thereof. The counter 1 counts up the count value thereof at the end of a data sector. The counter 2 counts up the count value thereof when data is normally read out with the ECC of the data sector completed. The counter 3 holds the count value thereof until a position of the servo information. The counter 4 holds the count value of the counter 3 until a verification signal of the next servo information is outputted. The verification signal is a pulse signal that represents an on-track state when the head is placed at a target track without any problem based on immediately preceding servo information. The verification signal, which has been used in a write operation, is used in a read operation as well in accordance with the present embodiment of the technique. The verification signal is outputted from the head position placement controller 40.

The counter 5 holds the count value of the counter 1 until the position of a servo mark. In response to the verification signal or at the update timing of the counter 2, counter 6 copies and holds the count value at the counter 2 or the count value at the counter 5, whichever is smaller. The counter 7 is used to exchange data with the host apparatus And the counter 7 cumulatively sums an increment in the count value thereof at the update timing of the counter 6. If data is outputted to the host apparatus, the corresponding output portion is subtracted from the count value of the counter 7.

The counters 5 and 6 have a function of minimizing a delay, if such a delay is caused in an ECC correction operation. The counter 7 controls a data flow operation with the host apparatus, thereby promoting the efficiency of data outputting.

The data flow controller 8 controls data flow to the host apparatus 200 by monitoring the counter 7. The interface controller 9 controls data outputting to the host apparatus 200 from the magnetic disk controller 10, by determining whether read data is on an on-track sector or not. In one embodiment, the determination operation of whether the data is on the on-track sector or not may be left to the responsibility of the microprocessor 20 and the interface controller 9 may simply control whether to output the read data to the host apparatus 200.

Each of the above-described counters 1-7 is controlled by the magnetic disk controller 10.

Using the counter 2 that counts up the count value thereof when data is read out through the ECC correction operation, the magnetic disk device transmits read data to the host apparatus 200 after determining whether the read data is to be transmitted to the host apparatus 200. The magnetic disk device 100 of the embodiment of the present technique determines whether to transmit the read data using the counters 3 and 4 added, separate from the counter 2. The counter 3 is updated with the servo information, and the counter 4 remains unupdated until the on-track sector is verified in response to the verification signal.

Figure 3:
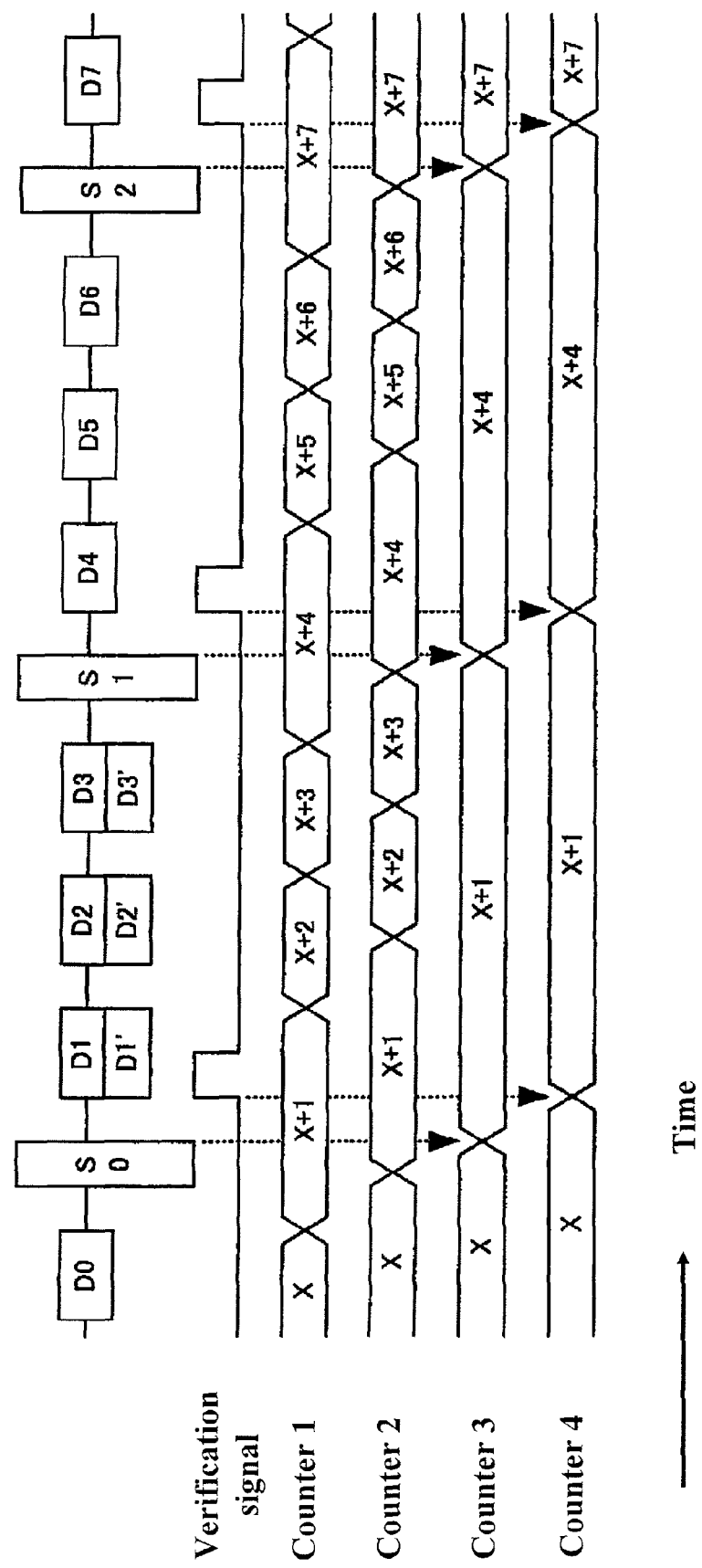
FIG. 3 is a diagram illustrating how data written on an unpredictable track is detected.

FIG. 3 illustrates how data written on an unpredictable track is detected using the counters 1-4 and how data garbling resulting from erroneous reading of old data is controlled.

Hereinafter, let S0, S1, . . . , Sn represent the servo information, D0, D1, . . . , Dn represent sectors, and D0', D1', . . . , Dn' represent sectors on which data is wrongly written into.

FIG. 3 illustrates that sectors D1', D2' and D3' having data wrongly written thereon are present between the servo information S0 and the servo information S1. In the discussion that follows, such sectors are present between servo information S0 and servo information S1. The sectors may be present between any pieces of servo information. The drawings to be referred to in the following discussion have T axis as a time axis.

The counter 1 counts up the count value thereof at the end of the sector Dn, and the counter 2 counts up the count value thereof at the timing of the ECC correction operation performed on the data stored on the sector that has triggered the counting up of the counter 1. A time lag corresponding to an ECC correction operation takes place between the counter 1 and the counter 2. Since the completion of the ECC correction operation and the counting up of the counter 1 are non-synchronous, the counter 1 and the counter 2 are non-synchronous with each other.

The counter 3 holds a count value (X+1) of the counter 2 at a position of the servo information S0 until a position of the servo information S1 (next servo information), and the counter 4 holds a count value (X+1) of the counter 3 until a verification signal of the servo information S1.

When the verification signal of the servo information S1 determines that the servo information S1 is in an on-track state, the counter 4 counts up the count value thereof. If the servo information S0 is in an on-track state, it is thus determined that the sectors D1, D2 and D3 between the servo information S0 and the servo information S1 are not wrong sectors but correct sectors from which data is to be transmitted to the host apparatus 200.

When the counter 4 counts up in this way, the sectors between the adjacent pieces of servo information are determined to be the ones in the on-track state. More specifically, the interface controller 9 determines that the sectors D1, D2 and D3 within a count value the counter 4 counts up (corresponding to three sectors as a difference between X+1 and X+4) are found to be in the on-track state. The data stored on the three sectors D1, D2 and D2 are transmitted to the host apparatus 200.

When the counter 4 counts up between the servo information S1 and next servo information S3, the verification signal of the servo information S2 determines that the servo information S2 is in the on-track state. Since the servo information S1 is in the on-track state as previously discussed, and the servo information S2 is also in the on-track state, the interface controller 9 determines that sectors D4, D5 and D6 are not sectors on unpredictable tracks and but sectors from which data thereon is to be transmitted to the host apparatus 200. The data stored on the sectors D4, D5 and D6 are then transmitted to the host apparatus 200.

Figure 4:
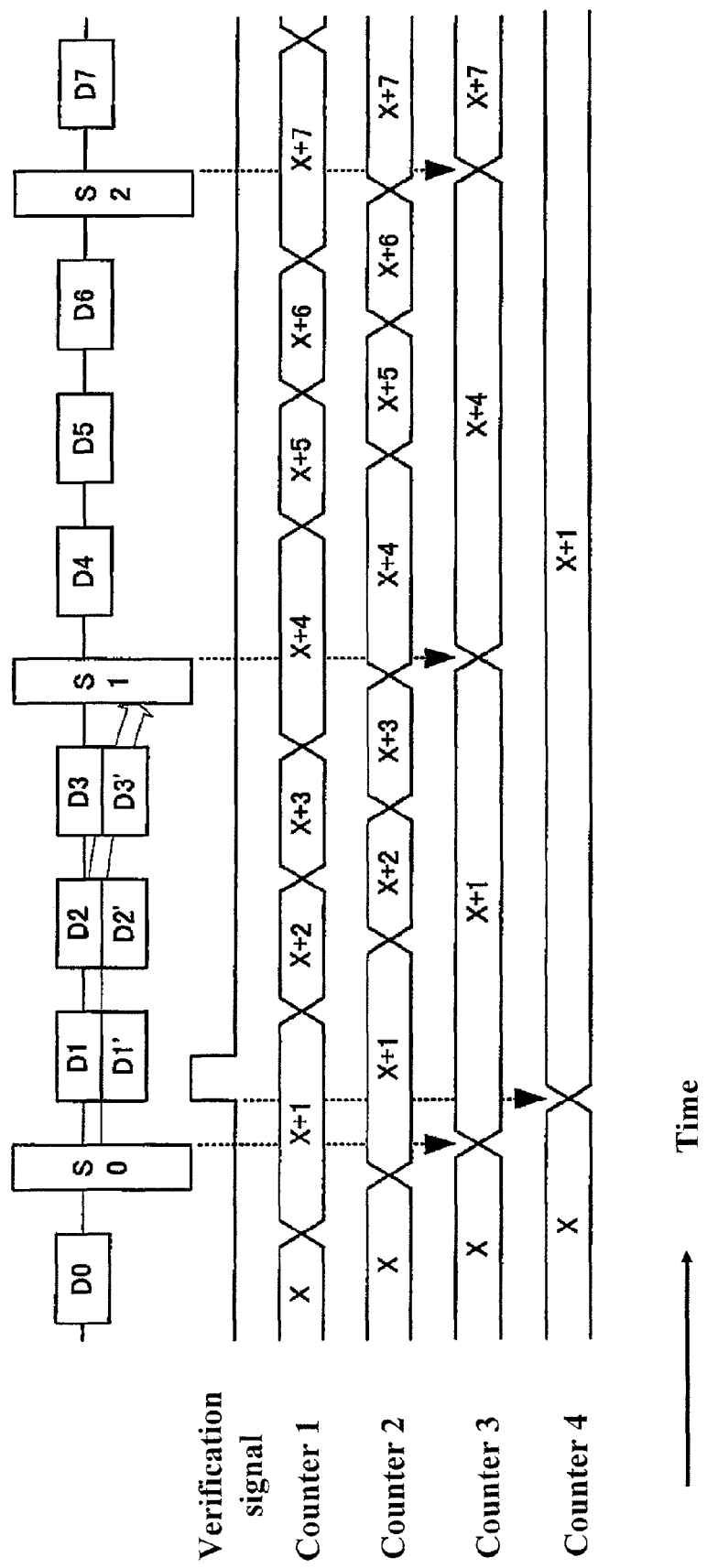
FIG. 4 is a diagram illustrating an off-track state in which no verification signal is outputted.

FIG. 4 illustrates an off-track state in which no verification signal is outputted. Since the servo information S1 is in the off-track state, the verification signal of the servo information S1 is not outputted. The counter 4 does not count up, and remains unchanged from X+1 that has been at the verification signal of the servo information S0. The data stored on the sector D1 and subsequent sectors is not outputted to the host apparatus 200. The verification signal is not outputted until the servo information S2 is verified. Even if the disk medium 74 reaches a predetermined rotating speed, a read error is triggered because the verification signal of the servo information S1 is not outputted.

Using the above-described counters, the magnetic disk device 100 and the magnetic disk controller 10 in accordance with the present embodiment determines whether a sector between predetermined servo information (first servo information) and subsequent servo information (second servo information), out of a plurality of pieces of servo information on the disk medium 74 is an on-track sector or not. Based on the determination results, the magnetic disk device 100 and the magnetic disk controller 10 control whether to transmit the data stored on the sector between the first servo information and the second servo information. Old data written into wrong sectors (off-track sectors) are thus prevented from being transmitted.

Figure 5:
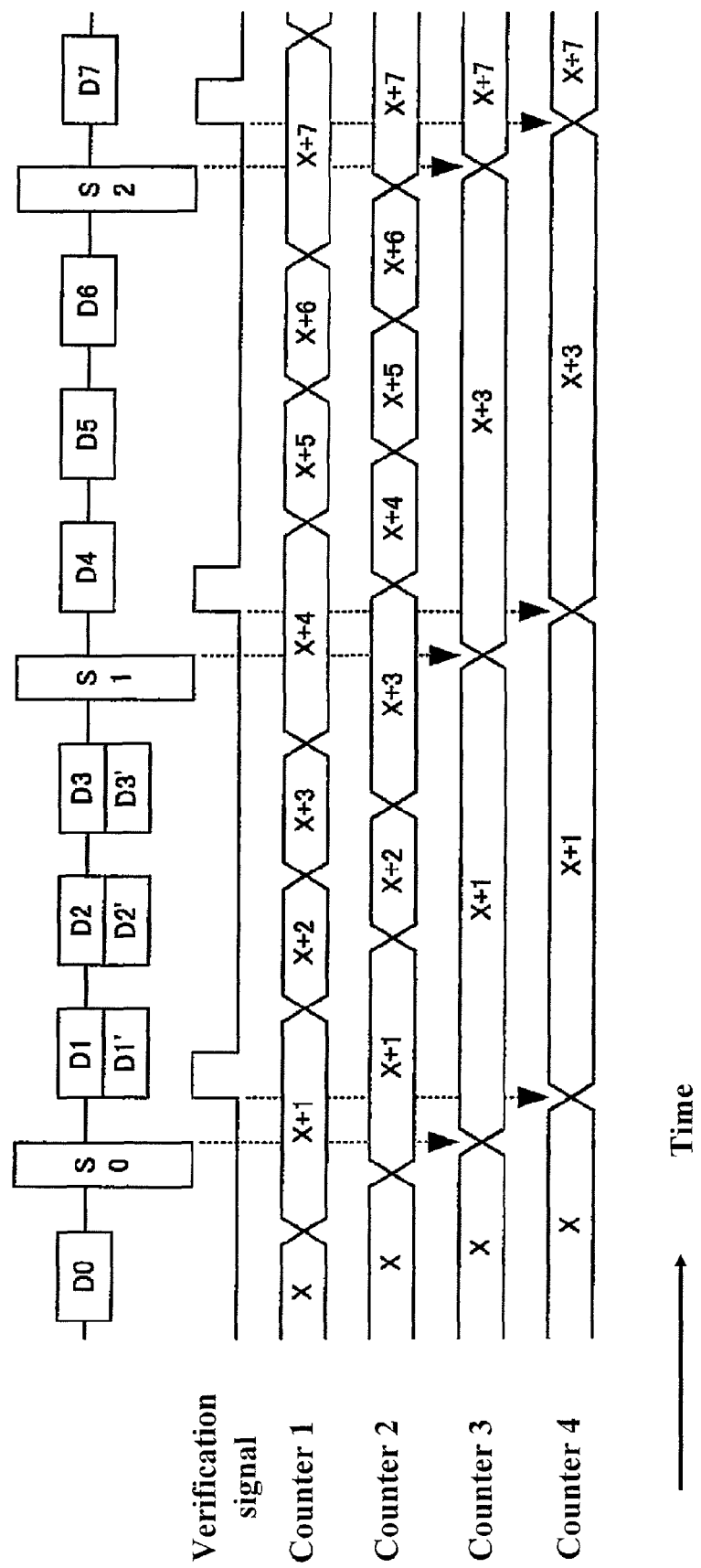
FIG. 5 is a diagram illustrating the case of a delayed ECC correction operation.

In the above discussion, the ECC correction operation is performed within a relatively short period of time. Data transmission may be delayed if the ECC correction operation is delayed and then completed after the reading of next servo information. FIG. 5 illustrates the case of a delayed ECC correction operation.

If the ECC correction operation of the data on the sector D3 is delayed and then completed after the verification signal of the servo information S1, the counter 2 has a count value X+3 at the output of the verification signal of the servo information S1 (the counter 2 had a count value X+4 if no delay takes place). The counter 4 counts up the count value thereof to the count value of the counter 3 at the output of the verification signal of the servo information S1, i.e., to X+3 (the count value of the counter 3 being equal to the count value of the counter 2). In this way, the number of sectors (three sectors of D1, D2 and D3) to be transmitted to the host apparatus 200 is different from the count value to which the counter 4 counts up (two sectors being a difference between X+1 and X+3). It is thus determined that D1 and D2 are sectors storing data to be transmitted to the host apparatus 200, and the data on the sectors D1 and D2 are then transmitted to the host apparatus 200. The determination of the sector D3 of whether D3 is an on-track sector is delayed to the outputting of the verification signal of the servo information S2.

To overcome the delay of the above-described data transmission, the magnetic disk controller 10 uses the counter 5 and the counter 6. This process is described below with reference to FIG. 6.

Figure 6:
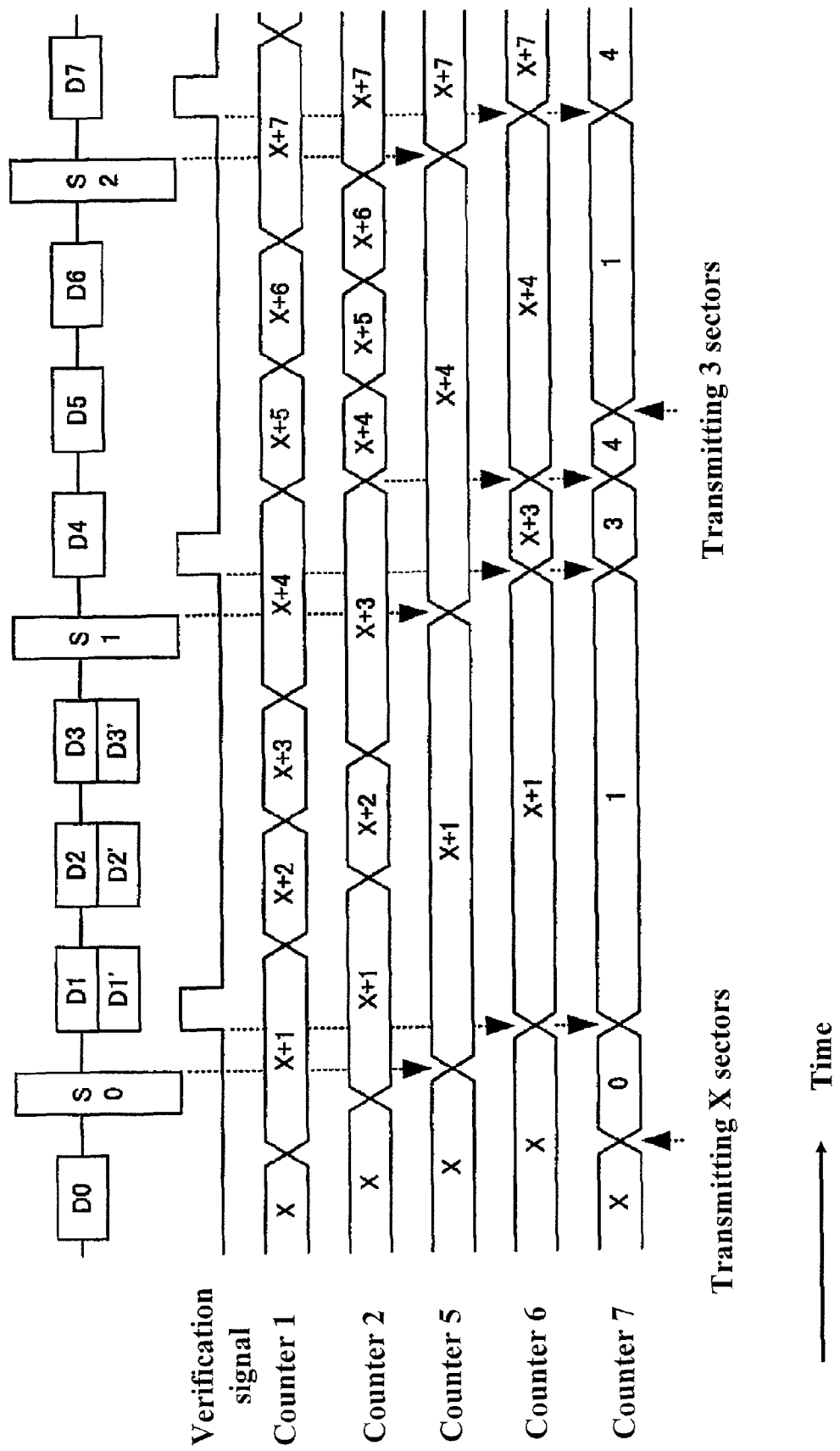
FIG. 6 is a diagram illustrating a counter for preventing count up delay and a counter operation for data flow.
Figure 7:
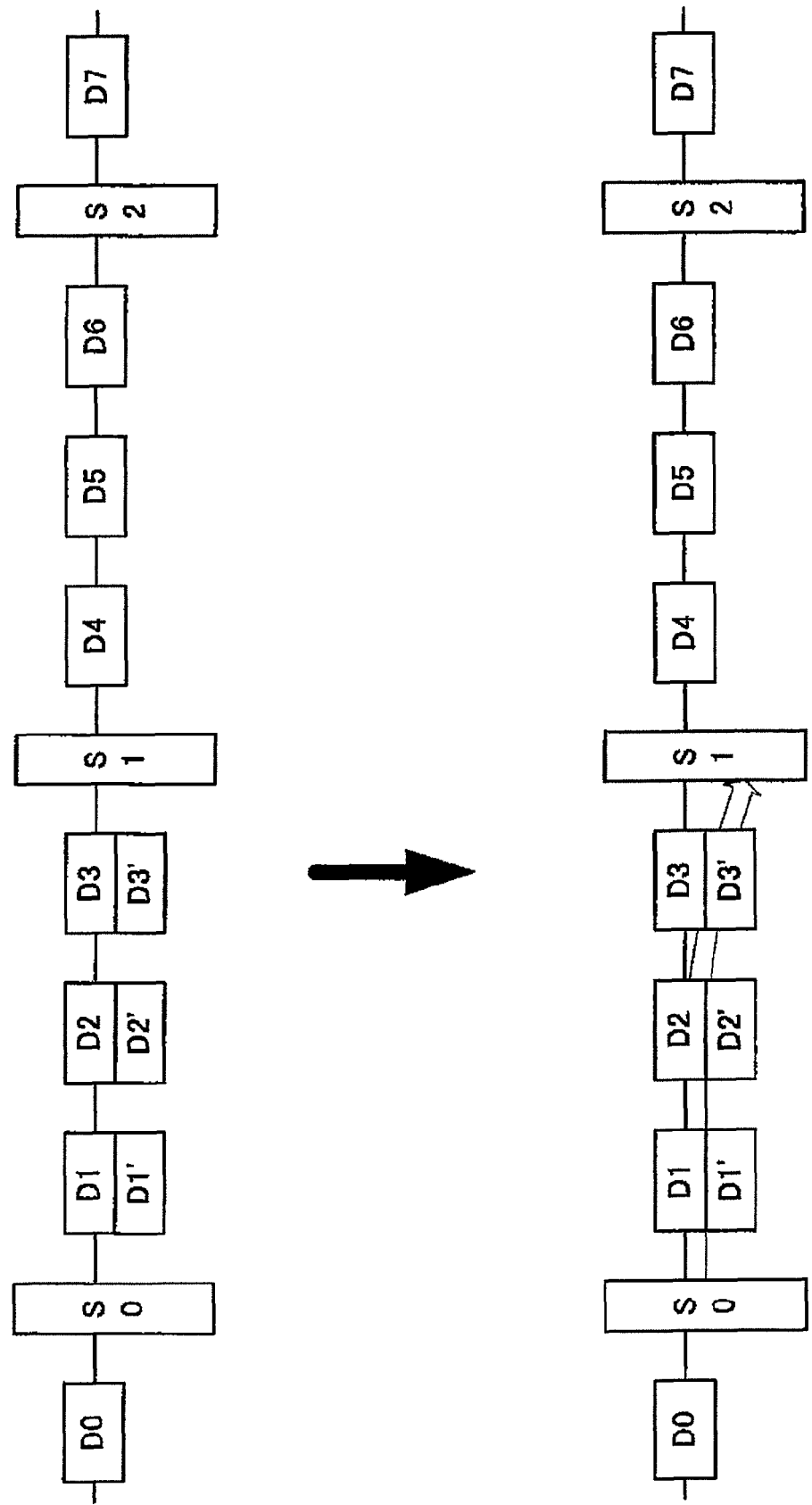
FIG. 7 is a diagram illustrating the case of data written into or read out from an unpredictable track.

As previously discussed, the counter 5 holds the count value of the counter 1 at the position of the servo information, and the counter 6 holds the count value at the counter 2 or the count at the counter 5, whichever is smaller, until the timing of the outputting of the verification signal or the timing of the updating of the counter 2. As illustrated in FIG. 6, the counter 6 counts up from X+1 to X+3 in response to the verification signal, thus having the count value at the counter 2. When the counter 6 counts up from the X+3 to X+4 at the update timing of the counter 2, thereby having the count value at the counter 2 or the count value at the counter 5, whichever is smaller. The sector to be transmitted is determined by the update timing of the counter 6.

More specifically, at the counting up timing of the counter 6 from X+1 to X+3, the interface controller 9 determines whether two sectors (corresponding to D1 and D2) as the difference between X+1 and X+3 are normal sectors in the on-track state with the ECC correction process completed. At the counting up timing of the counter 6 from X+3 to X+4, the interface controller 9 determines that one sector (corresponding to D3) as the difference between X+3 and X+4 is a normal sector in the on-track state with the ECC correction process completed. At the moment the delayed ECC correction operation is completed, the sector D3 is determined to be transmitted without waiting until the servo information S2. The amount of delay is thus minimized.

Since the count value of the counter 5 is X+4 when the counter 2 counts up to each of X+5, X+6, and X+7, the count value at the counter 6 remains unchanged.

The data on the sectors determined is temporarily stored on the data buffer 30 until the data becomes collected to an amount requested by the host apparatus 200 and then transmitted to the host apparatus 200 (the transmission of data to the host apparatus 200 is non-synchronous with the determination of the sectors to be transmitted). The data buffer 30 is a ring buffer, and the memory area thereof is limited. An amount of data stored on the data buffer 30 is thus monitored. The counter 7 holds as the count value thereof the number of sectors of the read data stored on the data buffer 30.

As previously described, the counter 7 sums an increment in the count value thereof at the update timing of the counter 6 and then subtracts from the count value thereof a value corresponding to the data outputted to the microprocessor 20. For example, as illustrated in FIG. 6, the data corresponding to a sector X may be stored on the data buffer 30. When the data corresponding to the sector X is transmitted to the host apparatus 200 at a predetermined timing, the counter 7 changes the count from X to 0. When the counter 6 counts up from X to X+1, the counter 7 changes the count value thereof from 0 to 1. Similarly, when the counter 6 counts up the count value thereof from X+3 to X+4, the counter 7 changes the count value thereof from 3 to 4. When data corresponding to the three sector is transmitted to the host apparatus 200, the counter 7 changes the count value thereof from 4 to 1.

The counter 6 is used in a data flow process to the host apparatus 200. The data flow controller 8 controls the data flow process to the host apparatus 200 by monitoring the counter 7. The interface controller 9 outputs data to the host apparatus 200 in accordance with the data flow control of the data flow controller 8.

In the above discussion, the counter 7 and the data flow controller 8 are used in conjunction with the counter 6 to control the data flow to the host apparatus 200. The structure and function of the counter 7 and the data flow controller 8 are also applicable to the counter 4 of FIG. 3.

In the above discussion, the count value at each counter typically is counted up. It is sufficient if the interface controller 9 learns a change in the count value at each counter, and a difference before and after the change. Each counter may be of a count down type.

The magnetic disk controller 10 in the present embodiment may be applicable as a magnetic disk control device having the same function.

The magnetic disk device 100 of the present embodiment has advantages as below.

The use of the counter 4 that reflects no change in the count value thereof until the on-track state is confirmed prevents read data in an off-track state from being erroneously transmitted to the host apparatus 200.

When the ECC correction operation is completed subsequent to the verification of the on-track state, the read data can be transmitted to the host apparatus 200 without waiting for next servo information.

With the magnetic disk controller 10 applied to the data flow to the host apparatus 200, the buffer area is efficiently used.

In accordance with embodiments of the present invention, the magnetic disk device, the magnetic disk control device, and the magnetic disk control method control whether to output, to the host apparatus, data read in an off-track state.

What is claimed is:

1. A memory device comprising:
   a medium including a plurality of tracks, each of which has a plurality of sectors separated by a plurality of servo areas, for storing data in the sectors of the tracks;

a head for writing data into and reading data from the medium; and a controller for determining whether the head has read out data from a sector on a target track correctly or not in reference to information obtained from servo areas sandwiching the sector and for driving the head so as to retry reading out data from the sector when the controller determines that the head failed to have read out data on the target track, wherein the controller comprises a first counter for counting a count value of thereof at an end of a sector, a second counter for counting a count value of thereof when data is read out with ECC of the data completed, a third counter for holding a count value thereof until servo information is obtained and a fourth counter for holding a count value of the third counter until a verification signal of the next servo information is outputted.

2. The memory device of claim 1, wherein the controller determines whether or not outputting the data stored in the sector on the basis of the information obtained from the servo areas sandwiching the sector.

3. The memory device of claim 1, wherein the controller determines that the head has not read data from the sector on the target track when the count value of the fourth counter is not updated.

4. The memory device of claim 1, wherein the controller comprises a fifth counter for holding the count value of the first counter until servo information is obtained and a sixth counter for holding the lesser value from the second counter and the fifth counter, until the timing of the outputting of the verification signal or the timing of the updating of the second counter.

5. The memory device of claim 4, wherein the controller comprises a seventh counter for updating a count value of thereof on the basis the count value of the fourth counter and a number of sectors outputted when the count number of the fourth counter is updated or data is outputted.

6. The memory device of claim 5, wherein the controller controls whether or not outputting data on the basis of the count value of the seventh counter.

7. A method of controlling a memory device having a medium including a plurality of tracks, each of which has a plurality of sectors separated by a plurality of servo areas, for storing data in the sectors of the tracks and a head for writing data into and reading data from the medium, the method comprising:

determining whether the head has read out data from a sector on a target track correctly or not in reference to information obtained from servo areas sandwiching the sector; and controlling whether or not outputting data read out by the head on the basis of the determining, wherein the memory device comprises a first counter for counting a count value of thereof at an end of a sector, a second counter for counting a count value of thereof when data is read out with ECC of the data completed, a third counter for holding a count value thereof until servo information is obtained and a fourth counter for holding a count value of the third counter until a verification signal of the next servo information is outputted.

8. The method of claim 7, further comprising driving the head so as to retry reading out data from the sector when the controller determines that the head failed to have read out data on the target track.

9. The method of claim 7, wherein the determining determines that the head has not read data from the sector on the target track when the count value of the fourth counter is not updated.

10. The method of claim 7, wherein the memory device comprises a fifth counter for holding the count value of the first counter until servo information is obtained and a sixth counter for holding the lesser value from the second counter and the fifth counter, until the timing of the outputting of the verification signal or the timing of the updating of the second counter.

11. The method of claim 10, wherein the memory device further comprises a seventh counter for updating a count value of thereof on the basis the count value of the forth counter and a number of sectors outputted when the count number of the fourth counter is updated or data is outputted.

12. The method of claim 11, wherein the controlling controls whether or not outputting data on the basis of the count value of the seventh counter.

13. A control apparatus for controlling a head for writing data into and reading data from a medium including a plurality of tracks, each of which has a plurality of sectors separated by a plurality of servo areas, the control apparatus comprising:

a determining unit for determining whether the head has read out data from a sector on a target track correctly or not in reference to information obtained from servo areas sandwiching the sector; and a control unit for controlling whether or not outputting data read out by the head on the basis of the determining result of the determining unit, wherein the determining unit comprises a first counter for counting a count value of thereof at an end of a sector, a second counter for counting a count value of thereof when data is read out with ECC of the data completed, a third counter for holding a count value thereof until servo information is obtained and a fourth counter for holding a count value of the third counter until a verification signal of the next servo information is outputted.

14. The control apparatus of claim 13, wherein the control unit controls not to output data when the determining unit determines that the head fails to have read out data on the target track.

* * * * *